US005193728A

United States Patent [19]

Pieroni

[11] Patent Number: 5,193,728

[45] Date of Patent: Mar. 16, 1993

[54] UNIDIRECTIONAL PINCH ROLLERS FOR A CLOTH SPREADING MACHINE

[75] Inventor: Robert J. Pieroni, Youngstown, N.Y.

[73] Assignee: Eastman Machine Co., Buffalo, N.Y.

[21] Appl. No.: 761,327

[22] Filed: Sep. 17, 1991

[51] Int. Cl.[5] ........................ G03B 1/56; B65H 20/02

[52] U.S. Cl. ........................ 226/90; 226/181; 226/186

[58] Field of Search ........................ 226/90, 181, 182, 186, 226/187, 91, 92, 156, 195

[56] References Cited

U.S. PATENT DOCUMENTS

| | | | |
|---|---|---|---|
| 3,743,153 | 7/1973 | Moss | 226/91 |
| 3,884,407 | 5/1975 | Sugimizu | 226/90 |
| 3,884,747 | 5/1975 | Soto | 226/187 X |
| 4,029,247 | 6/1977 | Sakariason | 226/90 X |
| 4,053,092 | 10/1977 | Edwards | 226/90 |
| 4,508,252 | 4/1985 | Ivary et al. | 226/90 X |
| 4,527,174 | 7/1985 | Fujiwara et al. | 226/181 X |
| 4,690,344 | 9/1987 | Yokata | 226/156 X |

*Primary Examiner*—Daniel P. Stodola
*Assistant Examiner*—Paul Bowen
*Attorney, Agent, or Firm*—Sommer, Oliverio & Sommer

[57] ABSTRACT

An end cutter includes a pair of rollers (64,73) operatively arranged to frictionally engage cloth passing through the nip thereof. One of the rollers is mounted for unidirectional rotation such that the cloth may be pulled forwardly from a roll, but cannot retract when such pulling force is released. The logic includes a pressure comparator and pneumatically-operated safety dump valve (92,94) for sensing whether the cutter (31) has encountered a motion-impeding obstruction on its forward cutting stroke, and automatically releases the force urging the cutter to move forwardly in such event. The cutter is mounted on a rodless cylinder (48).

12 Claims, 4 Drawing Sheets

UNIDIRECTIONAL PINCH ROLLERS FOR A CLOTH SPREADING MACHINE

TECHNICAL FIELD

The present invention relates generally to the field of cloth spreading and cutting machines, and, more particularly, to an improved automatic end cutter having a pair of rollers operatively arranged to permit a length of cloth to be pulled unidirectionally from a roll, but for preventing such length from moving back toward the roll when the pulling force thereon has been released, and having improved fluidic circuitry, with integral safety logic, for selectively raising, lowering, and translating the cutter.

BACKGROUND ART

In the preparation of finished fabric goods, such as clothing and the like, it is first necessary to unwind cloth from a roll. The unwound cloth is cut into sheets of desired lengths, and such sheets are then superimposed on top of one another to form a stack of cut plies of such material. Thereafter, a suitable pattern may be placed on top of the stack, and the entire stack may be cut en banc according to the pattern to form various individual pieces, which are then sent to subsequent sewing and finishing stations.

The present invention provides an automatic end cutter for use in such cloth spreading and cutting apparatus. One example of a prior art automatic end cutter is shown and described in U.S. Pat. No. 4,779,500, the aggregate disclosure of which is hereby incorporated by reference, and which is assigned to the assignee of the present application. That patent discloses an end cutter in which cloth is unwound from a roll, and is pulled along a cloth spreading table. The patent also shows and describes an automated means for cutting an end length from the unwound cloth. Basically, cloth is first pulled from the roll and is spread upon the table. A cutter is then energized and moved forwardly across the table to sever an end length from the roll. After this length has been cut, the cutter is returned to its initial position. At this point, the cutter and carriage are automatically lifted and lowered to clamp the trailing end of the just-cut length of cloth, and any plies therebeneath. Operators on either side of the table then grasp the free or cut end of the cloth, and pull another length from the roll so as to overlie the previously cut length, and the cutting operation is repeated.

While the device disclosed in the '500 patent does provide a type of automated end cutter, a number of problems have persisted. First, when cloth is pulled from a roll, the unwound length of cloth is put in tension. When released, the advanced length has a tendency to retract or move back toward the roll. Thus, as a practical matter, it is somewhat difficult to accurately position the unwound length at the desired location of the intended cut.

Secondly, the '500 patent discloses a belt-type arrangement for selectively raising the cutter and carriage relative to the table. The carriage and cutter were returned to their lowered position by the force of gravity, amplified by a weight mounted on the distal end of the belt. Thus, the downward clamping force was substantially constant. Upon further reflection and experience, it is felt that it would be desirable to exert a variable downward force on the stack of cut sheets or plies at a controllable down-pressure, in order to more easily accommodate different types of cloth.

Thirdly, the '500 patent did not have a mechanism for stopping the advance of the cutter in the event that cloth "bunched" ahead of the cutter to provide an impediment to the forward motion of the cutter.

Accordingly, it would be generally desirable to provide an improved automatic end cutter incorporating features to solve these problems.

DISCLOSURE OF THE INVENTION

With parenthetical reference to the corresponding parts, portions or surfaces of the disclosed embodiment, merely for purposes of illustration but not by way of limitation, the present invention provides a number of specific improvements for such an automated end cutter.

In one aspect, the invention provides an improvement for use in apparatus, such as an end cutter (e.g., 20), in which a length of flexible sheet material, such as cloth C, may be advanced. In this form, the improvement broadly includes: roller means (e.g., 32) mounted on the apparatus and operatively arranged to constrain the material to move unidirectionally when the sheet is pulled, and to resist the tendency of the stretched material to move rearwardly back toward the roll when the pulling force is released. The roller means includes a first roller (e.g., 64) mounted for free rotation about a first axis (e.g., 65); a second roller (e.g., 73) mounted for unidirectional rotation about a second axis (e.g., 74) arranged substantially parallel to the first axis; each of the rollers having an outer peripheral surface (e.g., 68,68); the first and second axes being mounted for selected relative movement toward and away from one another between a first position (e.g., as shown in FIG. 5) at which the outer peripheral surfaces of the rollers are biased to forcibly engage one another, and a second position (e.g., as shown in FIG. 6) at which the peripheral surfaces of the rollers are spaced from one another; whereby, when the rollers are in the first position, material positioned between the rollers will be gripped by the outer peripheral surfaces thereof, and will be constrained to move in only one direction.

In another aspect, the invention provides another improvement for use in apparatus (e.g., 20) associated with a fluid source (e.g., $P_s$), and having a carriage (e.g., 30) mounted for vertical upward and downward movement relative to a table (e.g., 21) upon which cloth is to be spread, and wherein the carriage is adapted to be selectively moved to a lowered position to forcibly engage one or more plies of sheet material arranged in a stack. In this aspect, the improvement includes: two double-acting fluid-powered actuators (e.g., 38,38), each actuator having a cylinder (e.g., 39) mounted on the table, having a piston (e.g., 82) mounted for movement within the cylinder and dividing the associated cylinder into upper and lower opposed chambers (e.g., 83,84), and having a rod (e.g., 40) having one marginal end portion fixed to the piston and having another marginal end portion connected to the carriage; and flow control means (e.g., 91,91') connected to the source and return for controlling the flows of fluid with respect to the actuator chambers for selectively raising and lowering the carriage relative to the table, the flow control means including means (e.g., 90,90') for varying the pressure differential between the actuator chamber so as to control the force exerted on the stack when the carriage is in a lowered position.

In still another aspect, the invention provides another improvement in a cloth cutting machine (e.g., 20) including a carriage (e.g., 30) having an upper surface against which cloth may rest, and having a cutter (e.g., 31) movable bidirectionally along the carriage between an initial position and an extended position. In this aspect, the improvement includes a rodless cylinder (e.g., 48) mounted on the carriage and having a fluid-powered piston (e.g., 85) arranged to be moved along the cylinder, the cutter being mounted on the piston for movement therewith; whereby, the cutter will move with the piston.

These and other objects and advantages will become apparent from the foregoing and ongoing written specification; the drawings, and the appended claims.

DESCRIPTION OF THE PREFERRED EMBODIMENT(S)

Figure 2:
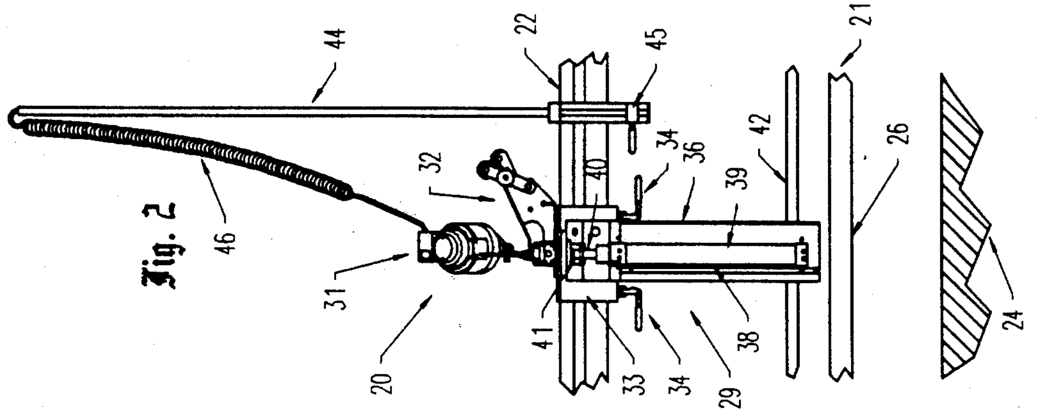
FIG. 2 is a fragmentary right end view of the end cutter shown in FIG. 1.

At the outset, it should be clearly understood that like reference numerals are intended to identify the same parts, portions or surfaces consistently throughout the several drawing figures, as such parts, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" simply refer to the orientation of a surface relative to its axis of elongation, or axis of rotation, as appropriate.

Figure 1:
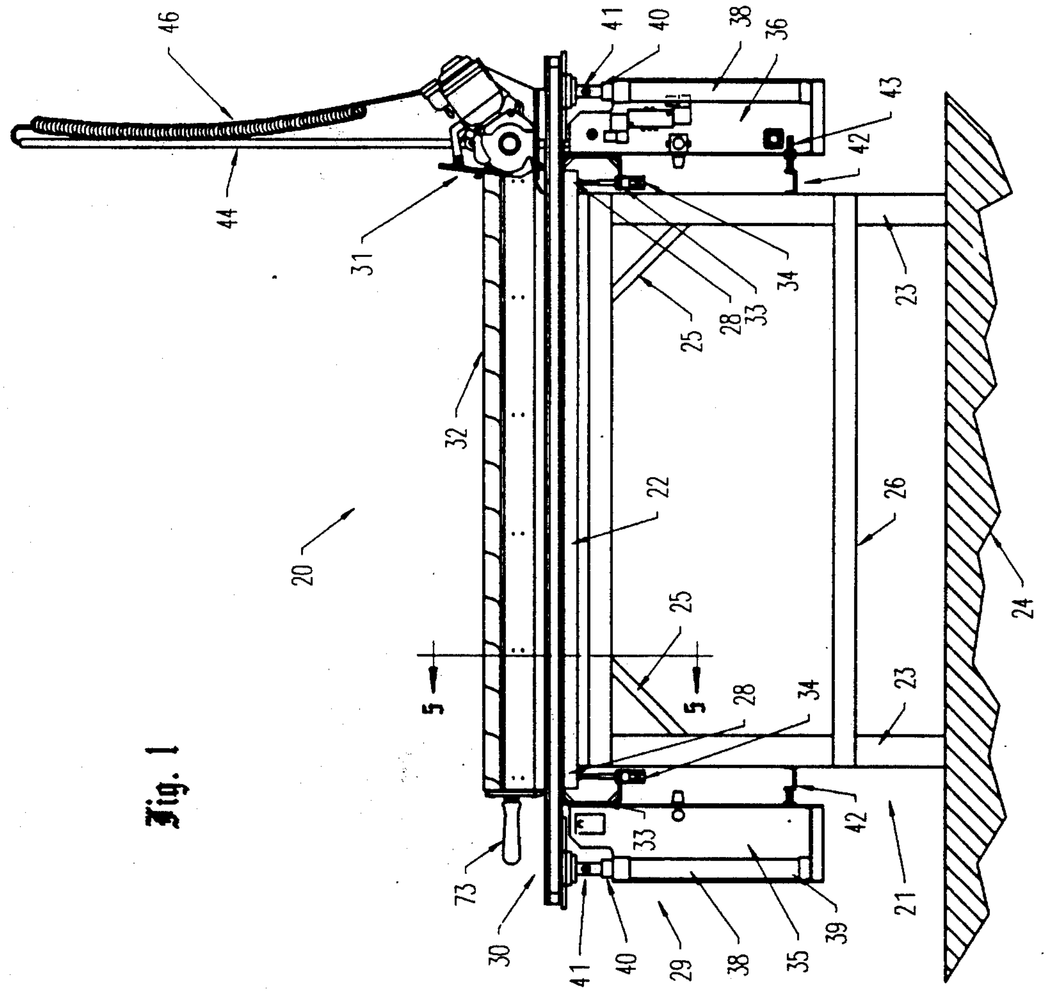
FIG. 1 is a fragmentary end view of a cloth spreading table, showing the improved automatic end cutter as being mounted thereon and as extending thereacross.

Referring now to the drawings, and, more particularly, to FIGS. 1 and 2 thereof, this invention provides an improved automatic end cutter, generally indicated at 20, which is adapted to be removably mounted on an elongated table 21 upon which cloth from a roll (not shown) is to be advanced, spread and cut. The table is shown as having a horizontal planar top 22 from which a plurality of legs, severally indicated at 23, depend to rest upon a suitable support 24. The top and legs are rigidified by plurality of diagonal braces, severally indicated at 25, and the lower marginal end portions of the legs are interconnected by a plurality of horizontal cross-bars, severally indicated at 26. Thus, table 21 is suitably strengthened by means of these various braces and bars to form a rigid assembled structure. As best shown in FIG. 1, transversely-opposite marginal end portions 28,28 of the table top extend beyond the supporting legs for purpose hereinafter apparent.

The improved end cutter 20 is adapted to be quickly and removably attached to table 21 for advancing and spreading a length of cloth C from the roll (or some other source of cloth), and for cutting such advanced length of cloth at a desired location therealong. The improvement broadly includes a somewhat saddle-shaped frame, generally indicated at 29, adapted to transversely straddle and be mounted upon the table, a carriage 30 mounted for controlled upward and downward vertical movement relative to the frame, a cutter 31 mounted for controlled horizontal movement back and forth along the carriage, and roller means 32 for assisting in advancing and spreading cloth from the roll, and for holding such advanced length while the same is cut by the cutter.

Figure 3:
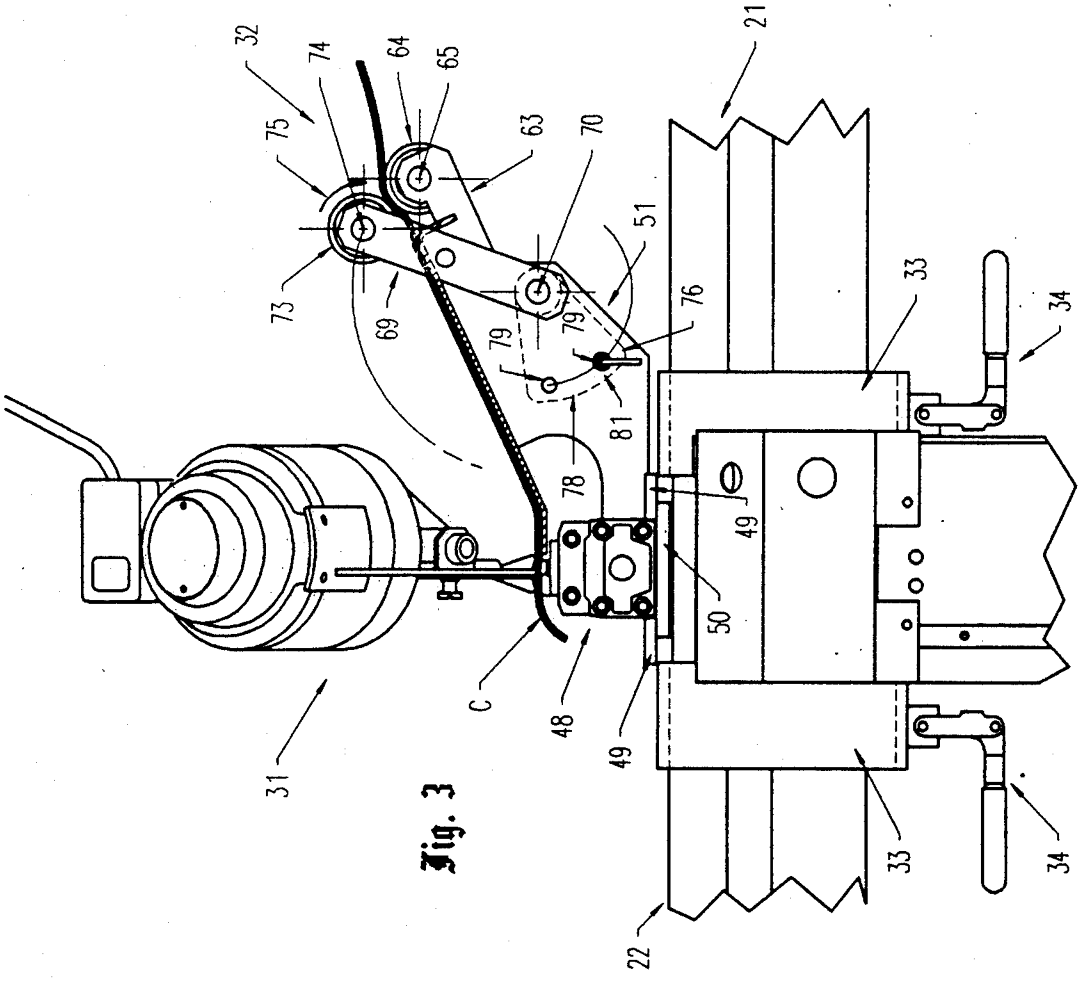
FIG. 3 is a fragmentary enlarged end view of the cutter, carriage and the cloth-gripping rollers shown in FIG. 2, with the proximate handle removed for clarity of illustration, this view also showing a length of cloth as passing between the rollers and lying on as the guide.

As best shown in FIGS.1-3, frame 29 includes two pairs of opposing inwardly-facing C-clamps, severally indicated at 33, which are adapted to engage the transversely-extending marginal end portions 28 of the overhanging table top. Each C-clamp has a toggle-like actuating lever, severally indicated at 34, which may be readily manipulated to releasably clamp the associated C-clamp to the table top. While the improved apparatus is shown as being operatively clamped to the table top in the several drawing figures, persons skilled in this art will readily appreciate that the toggle-like actuating levers may be selectively moved to their alternative released positions to permit the apparatus to be quickly and easily removed from the table.

The frame further includes left and right portions 35,36, which are attached to, and which depend from, the left and right pairs of C-clamps. A double-acting fluid-powered actuator, preferably pneumatic, generally indicated at 38, is operatively arranged to act between each frame portion and the carriage. More particularly, each actuator is shown as having a cylinder 39 suitably secured to the associated frame portion, and a rod 40 mounted for vertical movement relative to its cylinder. The upper marginal end portion of each rod is pivotally connected to the carriage 30 via a clevis-type connection 41.

As best shown in FIGS. 1 and 2, longitudinally-extending horizontal channel-shaped members, severally indicated at 42, are mounted on intermediate portions of legs 23, and are engaged by adjustable jack screws 43 on the depending frame portions to prevent the frame portions from pivoting about their connection with upper C-clamps 33 when the carriage is raised and lowered. Jack screws 43 may, of course, be suitably adjusted to alter the axis of rod extension. The actuators are operatively connected to a source of pressurized fluid, preferably compressed air, via suitable valves and pneumatic logic circuitry, as described infra, in order that the carriage and the cutter may be selectively raised and lowered, when desired.

A flexible power mast 44 is clamped to the table by another toggle-actuated C-clamp 45, and supplies electrical power from a suitable source (not shown) to cutter 31 through the mast and a coiled cord 46. Other types of devices, as desired, may be alternatively employed to supply electrical power to the cutter at the various operative positions of the carriage relative to the frame, and at the various positions of the cutter relative to the carriage.

As best shown in FIGS. 3 and 5–7, carriage 30 includes a rodless cylinder 48 which extends substantially the full transverse width of table top 22. As best shown in FIG. 3, a pair of elongated opposite left and right plate-like flanges 49,49 are fixed to, and extend laterally outwardly from, opposite sides of cylinder 48. An elongated strip-like cushion 50 of resilient material is affixed to the bottom of cylinder 48 to cushion the impact of the carriage with the table top when the carriage is lowered. The rodless cylinder is available from Miller Fluid Power, 800 North York Road, Bensenville, Ill. 60106. Additional details of the rodless cylinder may be found in U.S. Pat. No. 4,829,881, the aggregate disclosure of which is hereby incorporated by reference. Because the rodless cylinder is commercially available, a detailed discussion of the same will be omitted. Suffice it to say that such a rodless cylinder has a piston (FIG. 8) mounted for movement within a cylinder. A flexible seal on the cylinder permits access to the movable position therewithin, at various positions of the piston relative to the cylinder. This type of device, therefore, overcomes the problem in conventional actuators of having to provide space to accommodate the extension of a rod. Thus, in the improved device, the piston will have a range of movement substantially the full length of the cylinder, without having one or more rods extending outwardly therebeyond to interfere with personnel or other machinery.

Figure 4:
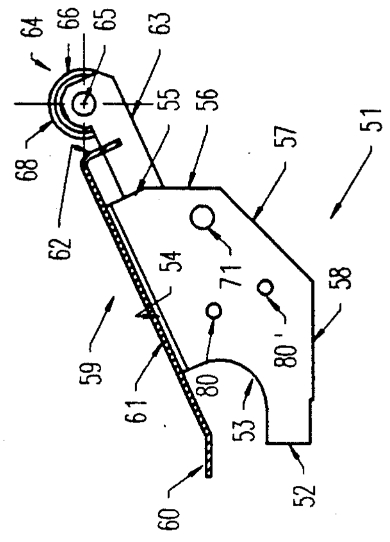
FIG. 4 is an end view of the end plate shown in FIG. 3, showing such end plate in elevation

In any event, the roller means 32 are mounted on the carriage for movement therewith. To this end, a plurality of horizontally-spaced parallel support plates, an end one of which is indicated at 51 in FIGS. 3 and 4, are mounted on the carriage and extend outwardly (e.g., rightwardly or rearwardly) therefrom at various spaced positions therealong. In the preferred embodiment, there are six such spaced support plates. Of these, two are end plates and four are intermediate plates, although a greater or lesser number could alternatively be employed.

As best shown in FIG. 4, each end plate 51 is a specially-configured vertically-disposed plate-like member having a vertical left end face 52 secured to and engaging rodless cylinder 48, an upwardly- and leftwardly-facing concave surface 53 extending away from the upper margin of left end face 52, an upwardly- and leftwardly-facing inclined planar surface 54, a rightwardly- and upwardly-facing inclined planar surface 55, a rightwardly-facing vertical right end face 56 a downwardly- and rightwardly-facing inclined planar surface 57, and a horizontal lower surface 58 extending leftwardly therefrom and provided with a shallow corner notch at its juncture with left end face 52 to receive right carriage flange 49.

An elongated cloth guide generally indicated at 59, is mounted on the several support plates to guide the advance of cloth C withdrawn from the roll or other source. As best shown in FIG. 3, this guide may be formed of sheet plastic or the like, and is suitably bent or otherwise formed to have, in transverse cross-section, a leftward horizontal marginal end portion 60, an intermediate inclined planar portion 61 extending upwardly and rightwardly therefrom, and an uppermost or rightward down-turned planar marginal end portion 62 extending downwardly and rightwardly therefrom in a direction generally perpendicular to intermediate portion 61. Guide 59 extends substantially across the width of the table.

As best shown in FIGS. 3–7, first arm 63 is fixed to each of the two end support plates, and extends upwardly and rightwardly beyond surfaces 55,56 thereof. A first cushioned roller 64 is mounted on the distal marginal end portion of arm 63 for free rotation about its pivotal axis 65. Roller 64 has a length of resilient material 66 wrapped helically thereabout to provide a cushioned outer peripheral surface 68. Alternatively, a hollow cylindrical tube of a suitable resilient material could be slipped over the roller. Hence the particular means of providing the roller(s) with a peripheral cushion may be readily changed or modified by persons skilled in this art. In any event, the pivotal axis 65 of this first roller is fixed with respect to the end plates.

A second movable arm, generally indicated at 69, has its lower marginal end portion pivotally connected to a shaft 70 penetrating aligned openings, one of which is indicated at 71, in the several support plates, and has its upper marginal end portion extending beyond guide 59. Shaft 70 may rotate relative to the several carriage-mounted plates. In the preferred embodiment, there are two of movable arms 69, and these are mounted on the outside surfaces of the two end plates such that they may be seen when the apparatus is viewed in end elevation. The second arms are therefore mounted on the end plates for pivotal movement about their lower pivotal axis 72, which is coincident with the axis of shaft 70.

A second roller 73, generally similar to roller 64, is mounted on the upper marginal end portion of arm 69 for rotation about pivotal axis 74. Thus, the second roller axis is mounted for pivotal movement along the indicated arc. In the preferred embodiment, second roller 73 is mounted for unidirectional rotation about its axis 74 such that the advancing length of cloth C may only be moved in one direction (i.e., from right-to-left in FIG. 3). In FIG. 3, the second roller is specifically shown as being mounted for rotation in a clockwise direction about axis 74, as indicated by the associated directional arrow 75 in FIG. 3.

A vertically-disposed pie- or sector-shaped plate 76,77 is mounted fast to shaft 70 immediately inside of the respective end plates. Each plate has the narrow marginal end portion proximate its apex suitably fixed to shaft 70, as by welding or the like, such that its larger arcuate end 78 is arranged to rotate about the horizontal shaft axis. The plate 76 shown in FIG. 3 is provided with two arcuately-spaced holes 79,79' which are adapted to register with similarly-spaced holes 80,80' provided in the end plate. A spring-biased toggle-actuated detent, generally indicated at 81, penetrates one of plate holes 79,79' and engages one of end plate holes 80,80' to hold the first and second rollers in the particular relative position shown in FIGS. 3 and 5. Detent 81 may be selectively released to allow the operator to rotate second arm 69 to the alternative position shown in FIG. 6, at which position detent 81 may be selectively engaged with the other of guide holes 79,79' and/or the other of end plate holes 80,80'.

The corresponding plate 77 at the other end of the carriage is structurally similar to plate 76, except that it is secured to the shaft at a different angular position. This plate has an arcuate slot 87 in lieu of holes 79,79', and has an associated detent, analogous to detent 81, which may be selectively engaged with slot 87. As noted above, these two plates are secured to the shaft at different angular positions. Thus, an operator standing on one side of the table may suitably manipulate the proximal detent relative to plate 76 to selectively hold the rollers in their first relative position shown in FIG. 5, or in their second relative position shown in FIG. 6. Alternatively, operators on both sides of the table may suitably manipulate the detents nearest them to selectively permit arm 69 to be moved to its third relative position, as shown in FIG. 7.

The illustrated form of the detent-and-recess mechanism may be readily modified. For example, the arc of pie-shaped plate and/or the end plate may be made longer so as to hold the rollers in any of the three relative positions shown in FIGS. 5–7. Other types of mechanisms may be substituted for the particular form shown.

Cutter 31 may be a prior art Falcon® end cutter, which is commercially available from Eastman Machine Company, 779 Washington Street, Buffalo, N.Y. 14203, the assignee of the present application. This type of cutter has a rotatable cutter blade driven by an electric motor. Cutter 31 is mounted on the piston of the rodless cylinder for movement back and forth along the carriage, this being across the width of the table. Other types of cutters may be substituted for this specific form.

Figure 6:
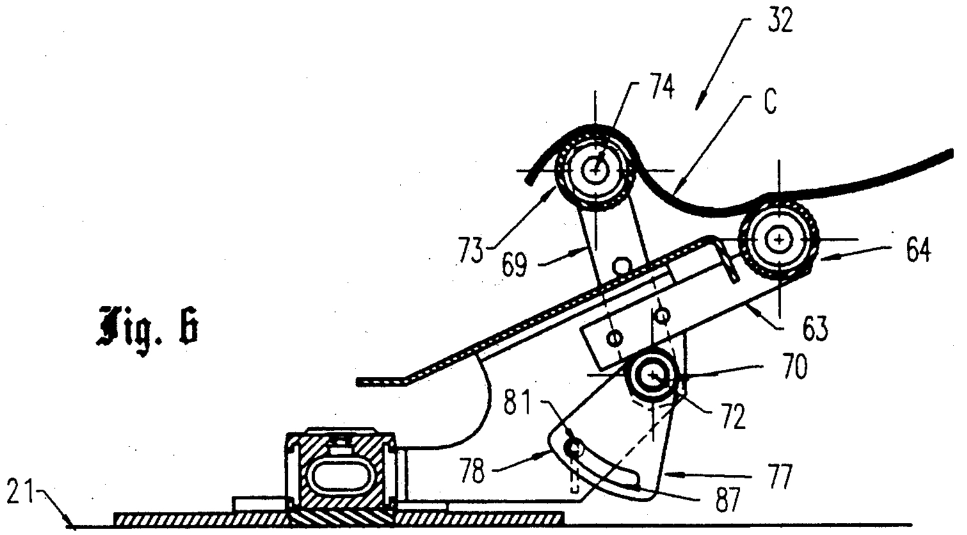
FIG. 6 is a fragmentary vertical sectional view thereof, generally similar to the view of FIG. 5, but showing the rollers as being in their second relative position, this view also showing a length of cloth as being draped over the separated rollers.
Figure 5:
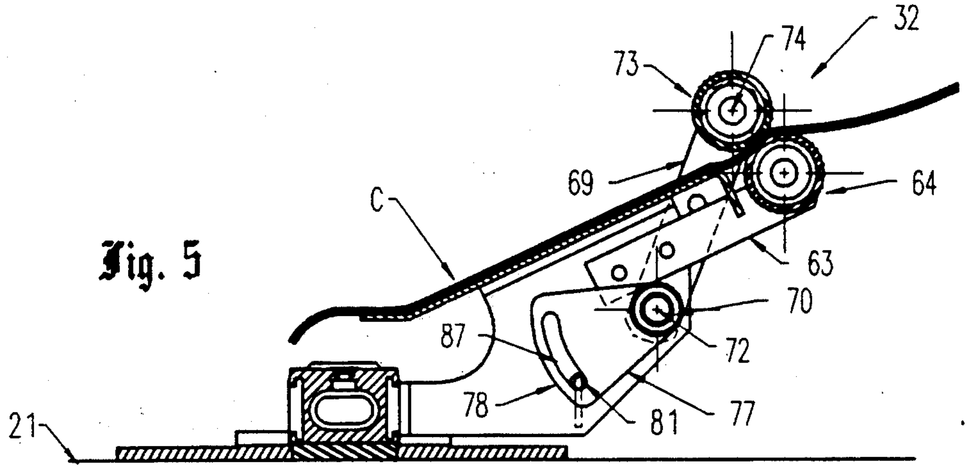
FIG. 5 is a fragmentary transverse vertical sectional view thereof, taken generally on line 5—5 of FIG. 1, showing the rollers as being in their first relative position, and gripping a length of cloth passing therebetween.
Figure 7:
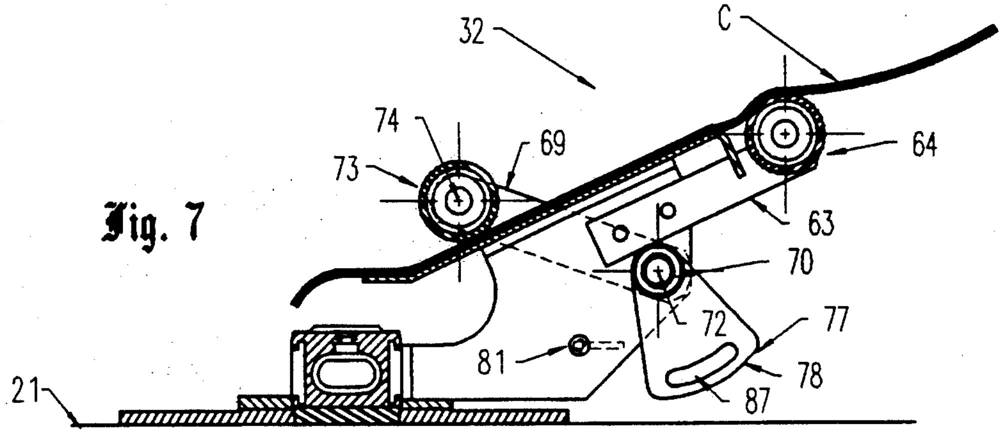
FIG. 7 is a fragmentary vertical sectional view thereof, again generally similar to the views of FIGS. 5 and 6, but showing the rollers as being in their third relative position, with a length of cloth being gripped between the second roller and the guide.

FIGS. 5–7 comparatively show the arm 69 and second roller 73 in three operative positions relative to first roller 64. FIG. 5 depicts the second roller as being in a first position relative to the first roller. In this position, the outer peripheral surfaces of the two rollers are biased to forcibly engage one another. Since the cushioned rollers are compressible, the length of cloth C may pass through the nip between the rollers with such cloth being frictionally held thereby. Since roller 73 is mounted for unidirectional angular movment (i.e., clockwise as seen in FIGS. 5–7), the length of cloth may be pulled leftwardly through the rollers. However, when the pulling force is released, the compressive frictional engagement of the rollers with the cloth will prevent that portion of the cloth which is held between the rollers and the roll (not shown) from retracting back toward the roll.

FIG. 6 depicts the second roller as being in a second position relative to the first roller. This position is obtained by having the operator suitably manipulate proximal detent 81 such that it releasably locks with the other of aligned holes 79,79' or 80,80'. In this position, the two rollers are physically separated from one another. In FIG. 6, the length of cloth C is shown as having been draped on the two spaced rollers. This represents an initial position of the rollers when a new length of cloth is to be fed therethrough. In other words, the rollers are first moved to the spaced second relative position, and a length of cloth is simply draped over the rollers, as as shown in FIG. 6. The operator then manually rotates second roller 73 about axis 74 in the permitted direction of rotation to permit the free end of the cloth to fall between the rollers. The operator then unlocks proximal detent 81, and, grasping proximal handle 75, swings arm 69 over to the first position shown in FIG. 5, and then re-engages the proximal detent. Such motion is permitted by distal detent sliding within slot 87. In this first position, the cloth will be grippingly captured in the nip between the two rollers.

FIG. 7 depicts an alternative third position of the second roller relative to the first roller. In this position, the second roller cushion forcibly engages an intermediate portion of cloth guide inclined portion 59 by virtue of the weight of the second roller. Thus, a length of cloth positioned between second roller 73 and the guide, will be frictionally engaged, and will be permitted to move in only one direction (i.e., from right to left in FIG. 7). The first or third positions (i.e., as shown in FIGS. 5 and 7, respectively) are used depending upon the type, nature and weight of cloth to be cut. For normal weight cloth, the first position shown in FIG. 5 may be acceptable, whereas the third position shown in FIG. 7 may be more suited for use with lighter-weight cloth or more delicate fabrics.

Figure 8:
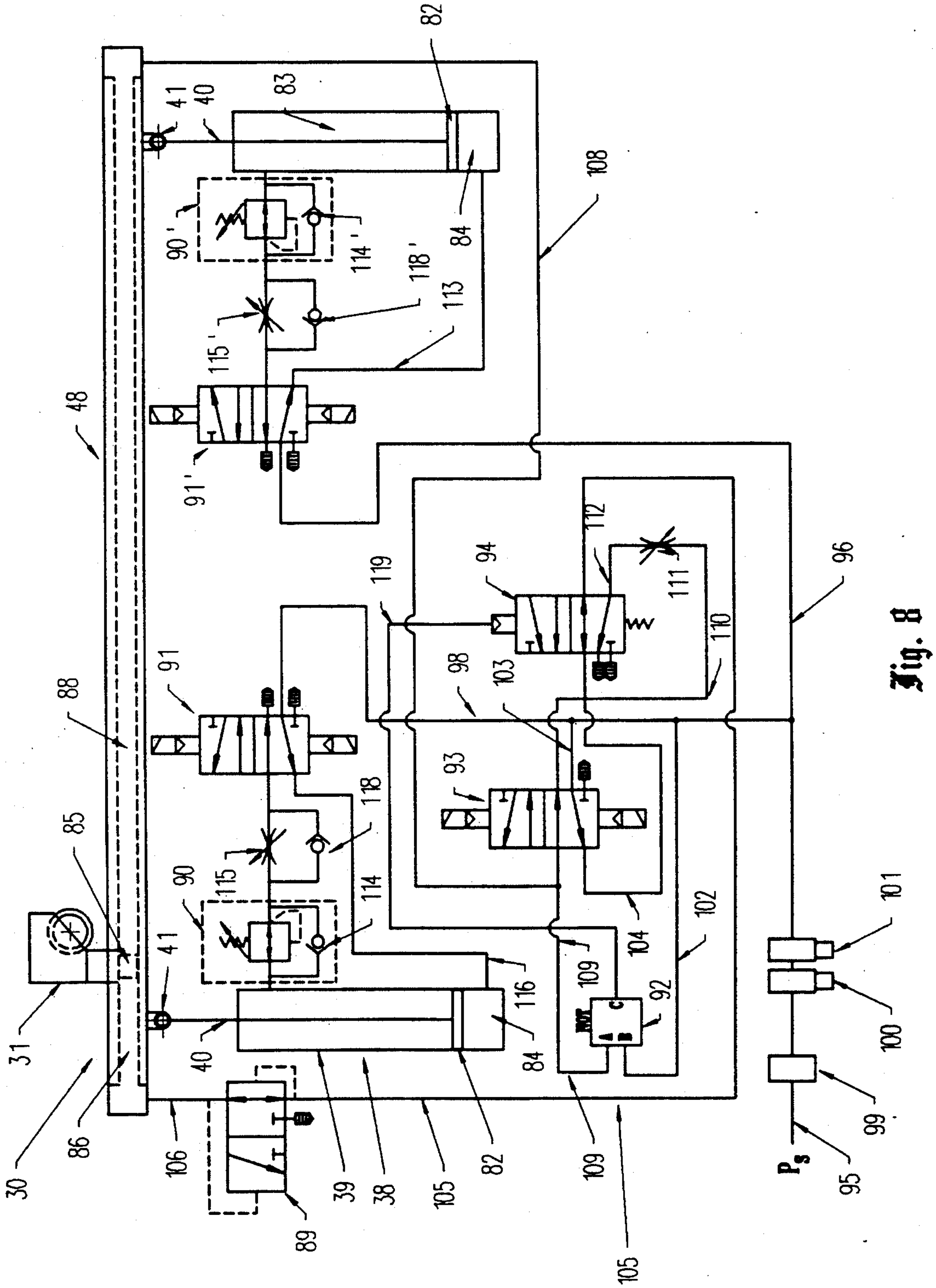
FIG. 8 is a schematic of the pneumatic circuitry of the improved end cutter.

FIG. 8 is a schematic depicting the pneumatic circuitry and logic of the improved end cutter. The two carriage-lifting actuators are again generally indicated at 38. Each actuator is depicted as having a piston 82 mounted for sealed sliding movement within a cylinder 39, and as subdividing the cylinder into upper and lower chambers 83,84. Rod 40 extends upwardly from each piston, sealingly and slidably penetrates the upper end wall of the associated cylinder, and has its upper marginal end portion connected to a respective end of the carriage via clevis-type connection 41, as previously described.

Rodless cylinder 48 is mounted on the carriage, and cutter 31 is connected to the piston 85 thereof for horizontal movement therewith relative to the cylinder. Piston 85 therefor subdivides the rodless cylinder into left and right chambers 86,88. Thus, a differential pressure between these two chambers will create a net force which causes piston 85 and cutter 31 to move horizontally relative to the carriage. The polarity of such pressure differential will determine the direction of movement.

The pneumatic circuit is further shown as broadly including a quick exhaust valve 89, left and right down-pressure control valves 90,90', electrically-operated left and right cutter direction control valves 91,91', a pressure comparator 92 functioning as a NOT element, an electrically-operated cutter direction control valve 93, and a pneumatically-operated safety dump valve 94. Valves 91,91' and 93 are electrically-operated solenoid-type two-position valves.

Pressurized fluid, preferably compressed air, at a supply pressure $P_s$, is supplied by a suitable source (not shown), and passes through communicating conduits 95,96 to right valve 91'. A branch conduit 98, connected between conduits 95,96, provides supply pressure to left valve 91. Conduit 95 contains a main shut-off valve 99, a filter 100 and a lubricator 101. Branch conduit 102 communicates with conduit 98 and continuously provides supply pressure to port "B" of pressure sensor 92. Conduit 103 communicates with conduit 98 and continuously provides supply pressure to cutter direction valve 93.

When cutter direction valve 93 is in the position shown in FIG. 8, pressurized fluid is provided through conduit 103, valve 93, conduit 104, safety valve 94, conduit 105, safety valve 89 and conduit 106 to rodless cylinder left chamber 86. At the same time, fluid in rodless cylinder right chamber 88 is vented to ambient via conduits 108,109, valve 93, conduit 110, variable orifice 111, conduit 112, safety valve 94 and an exhaust muffler. Thus, a positive pressure differential will exist between chambers 86,88 (i.e., the pressure in left chamber 86 will be greater than the pressure in right chamber 88), and the cutter will be moved from left to right so as to cut cloth as it moves from its leftward initial position across the table to its rightward extended position.

If the cutter direction valve 93 is moved to its alternative position while valve 94 remains in its illustrated position, fluid may flow from conduit 98 through conduit 103, displaced valve 93 and conduits 109,108, to rodless cylinder right chamber 88. At the same time, fluid in rodless cylinder left chamber 86 will be vented to ambient through conduit 106, safety valve 89 (which remains in the position shown), conduit 105, safety valve 94 (still in the position shown), conduit 104, displaced valve 93 and an exhaust muffler. Thus, in this alternative position of cutter direction control valve 93, piston 85 and cutter 31 will move from right to left on the non-cutting return stroke from its extended position back to its initial position.

When right lifting valve 91' is in the position shown in FIG. 8, fluid may flow from the source through conduits 95,96, lifting valve 91' and conduit 113 to the right actuator lower chamber. At the same time, fluid in right actuator upper chamber 83 is vented to exhaust by passage through check valve 114', restricted orifice 115' and valve 91'.

If left lifting valve 91 is also in the position shown, fluid may flow from the source through communicating conduits 95,98, lifting valve 91 and conduit 116 to the left actuator lower chamber 84. Similarly, fluid in left actuator upper chamber 83 will be vented to exhaust by passage through check valve 114, variable orifice 115 and valve 91.

As previously noted valves 91,91' are electrically operated and are adapted to be simultaneously moved between the position shown and their alternative positions. In the positions shown, and as described above, fluid will flow simultaneously into actuator lower chambers 84,84' and from actuator upper chambers 83,83'. Hence, pistons 82,82 will move upwardly so as to lift or elevate the cutter and carriage relative to the table.

Alternatively, when valves 91,91' are simultaneously moved to their alternative positions, fluid will flow from conduit 98 through displaced valve 91, check valve 118 and pressure regulator 90 to enter the left actuator upper chamber, and will be vented from left actuator lower chamber through conduit 116, and displaced valve 91. Fluid will simultaneously flow from conduit 96 through right valve 91', check valve 118' and pressure regulator 90' to right actuator upper chamber 83, and will be vented from right actuator lower chamber 84 by passing through conduit 113 and displaced valve 91'.

Thus, when the carriage is to be lifted, supply pressure is provided to actuator lower chambers 84,84, and speed control is provided by having the exhausting flows from upper chambers 83,83 to pass through variable orifices 115,115', respectively. Conversely, when the carriage is to be lowered, fluid must flow through pressure regulators 90,90' to the actuator upper chambers, these pressure regulators providing a means by which the down-pressure on the stack of cloth may be controllably varied.

Conduit 109 continuously communicates cutter direction valve 93 with inlet port "A" of pressure comparator 92. Conduit 119 communicates outlet port "C" of the comparator with the actuator of pressure-operated safety valve 94. Valve 94 is springbiased to the flow-permitting position shown in the absence of a pressure in conduit 119. As previously noted, comparator 92 functions as a pneumatic NOT element. If the pressure (P) at inlet port "A" is greater than or equal to the pressure at port "B", then no pressure will be provided at outlet port "C". However, if the pressure at port "A" is less than the pressure at port "B", then a pressure will exist at outlet port "C". Or, If $P_A < P_B$, then $P_C = 1$ If $P_A \geqq P_B$, then $P_C = 0$ When it exists, pressure $P_C$ will overcome the force exerted by the spring and will displace safety valve 94 to its alternative position. In this alternative position, conduits 105,112 will both be vented to ambient to prevent further translational movement of the cutter relative to the carriage. Comparator terminal "A" continuously monitors the pressure in rodless cylinder right chamber 88 via communicating conduits 109,108. Should the cutter encounter a motion-impeding obstruction on its forward (i.e., left-to-right) cutting stroke, the pressure in right chamber 88 will decrease such that $P_A < P_B$. When this occurs, comparator 92 will produce an output pressure $P_C$ which fires valve 94 to its alternative position, thereby venting both actuator chambers and stopping further translation of the piston. If desired, the presence of pressure $P_C$ may be used to deenergize the cutter motor, either immediately or after an appropriate time delay.

Valve 89 is manually operable, and may be selectively used to override valve 93 to return the cutter to its initial position relative to the carriage.

Modifications

The present invention contemplates that many changes and modifications may be made. For example, the logic of the pneumatic circuit could be electrical. Other types of valves, NOT elements, restricted orifices and regulators may be readily substituted for those shown. Similarly, other types of cutters, carriages, and actuators may be used.

Therefore, while the presently-preferred form of the improved end cutter has been shown and described, and several modifications thereof discussed, persons skilled in this art will readily appreciate that various additional changes and modifications may be made without departing from the spirit of the invention, as defined and differentiated by the following claims.

I claim:

1. In cutting apparatus in which a length of flexible sheet material may be pulled from a roll, the improvement which comprises:

roller means mounted on said apparatus and operatively arranged to constrain said material to move unidirectionally when said length is pulled, said roller means including:

a first roller mounted for free rotation about a first axis;

a second roller mounted for unidirectional rotation about a second axis arranged substantially parallel to said first axis;

each of said rollers having an outer peripheral surface; and a guide having an entrance end spaced from, but substantially aligned with, the nip between said rollers when said rollers are in said first position;

said first and second axes being mounted for selective relative movement toward and away from one another between a first position at which the outer peripheral surfaces of said rollers are biased to forcibly engage one another, and a second position at which said peripheral surfaces are spaced from one another;

said rollers being adapted to be selectively moved to a third relative position at which the outer peripheral surface of said second roller will forcibly engage said guide;

whereby, when said rollers are in said first position, material positioned between said rollers will be gripped by said outer peripheral surfaces, and will be constrained to move in only one direction, but when said second roller is in said third position, the length of material positioned between said second roller and guide will be gripped by the outer peripheral surface of said second roller and guide.

2. The improvement as set forth in claim 1 wherein one of said rollers is provided with a resilient cushion having an outer peripheral surface, and wherein the outer peripheral surface of said roller is the outer peripheral surface of said cushion.

3. The improvement as set forth in claim 2 wherein the outer peripheral surface of said one roller is compressed against the outer peripheral surface of other of said rollers when said rollers are in said first position.

4. The improvement as set forth in claim 2 wherein both of said rollers are provided with resilient cushions having respective outer peripheral surfaces, and wherein said cushion peripheral surfaces form the respective outer peripheral surface of said rollers.

5. The improvement as set forth in claim 4 wherein said cushion peripheral surfaces are compressed against one another when said rollers are in said first position.

6. The improvement as set forth in claim 5 wherein the resiliency of said cushions provides the sole means of biasing said outer peripheral surfaces to forcibly engage one another when said rollers are in said first position.

7. The improvement as set forth in claim 1 wherein said second roller is provided with a resilient cushion having an outer peripheral surface forming the outer peripheral surface of said second roller and wherein the resiliency of said cushion provides the sole means of biasing said second roller with peripheral surface against said guide position.

8. The improvement as set forth in claim 1 wherein said second roller is spaced from said first roller when said second roller is in said third position.

9. The improvement as set forth in claim 1 wherein said first axis is stationary, and wherein said second axis is mounted for movement relative to said first axis.

10. The improvement as set forth in claim 9 wherein the said second axis is mounted for pivotal movement about a pivotal axis.

11. The improvement as set forth in claim 10 and further comprising: interlock means operatively arranged to hold said rollers in either of said positions.

12. The improvement as set forth in claim 1 wherein said material is cloth.

* * * * *